United States Patent [19]

Siegel

[11] 4,203,295
[45] May 20, 1980

[54] SPACE REVERSIBLE DIFFERENTIAL TEMPERATURE ENGINE

[76] Inventor: Israel Siegel, 351 W. 71 St., New York, N.Y. 10023

[21] Appl. No.: 835,984

[22] Filed: Sep. 23, 1977

[51] Int. Cl.² ........................ F03G 7/02; F03G 7/06
[52] U.S. Cl. .................................. 60/531; 60/641; 60/640; 60/675
[58] Field of Search ................. 60/641, 531, 675, 640

[56] References Cited

U.S. PATENT DOCUMENTS

| | | | |
|---|---|---|---|
| 2,187,124 | 1/1940 | Harmon | 60/531 X |
| 3,846,984 | 11/1974 | Siegel | 60/531 X |

Primary Examiner—Allen M. Ostrager

[57] ABSTRACT

The invention consists of a reversible differential temperature engine especially adapted to convert solar thermal energy into mechanical energy in the absence of gravity in space. This is achieved by reversible means which allow the alternate function of each chamber of the differential temperature engine as an evaporator and condensor chamber.

2 Claims, 1 Drawing Figure

U.S. Patent
May 20, 1980
4,203,295
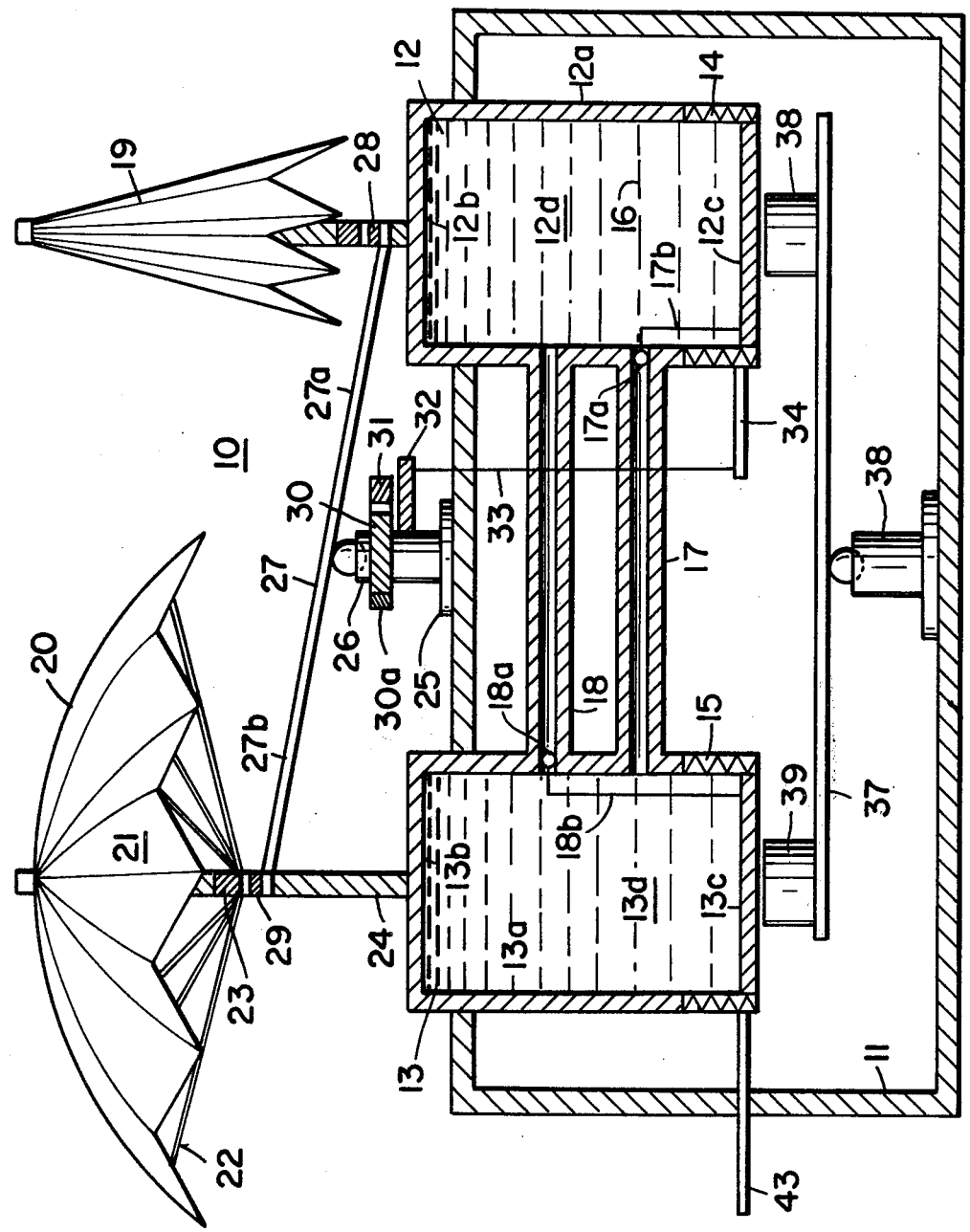

SPACE REVERSIBLE DIFFERENTIAL TEMPERATURE ENGINE

BACKGROUND AND OBJECTION

The invention relates to differential temperature engines previously invented by the author (U.S. Pat. No. 3,846,984, 1974) and in particular to solar differential temperature engines especially adapted to operate in space in the absence of gravity.

Differential temperature engines operate through a vapor pressure differential between a relatively cold chamber and a relatively warm chamber containing a low boiling point liquid. The operation of the engine requires an evaporation of the liquid in the warm chamber and a condensation of the vapor back to a liquid in the cold chamber. The liquid which condenses in the cold chamber must be returned to the warm chamber for the continuous operation of the engine. This occurs either through the force of gravity when the condensor chamber is at a higher level than the evaporator chamber, or through the action of a pump when the condensor chamber is at a lower level than that of the evaporator chamber. Gravity is essential not only for the return of the liquid by force of gravity but also for the return of the liquid by the action of a pump. This is caused by the fact that the condensation of vapor into a liquid in the cold chamber occurs through the formation of small liquid droplets upon the inside surfaces of the cold chamber. In the presence of gravity the droplets accumulate in the lowest portion of the condensor chamber to form a single body of liquid. A small stationary pump operating at the lowest point of the condensor chamber can transfer the liquid from the cold to the warm chamber. In the absence of gravity, however, most of the liquid droplets remain dispersed and could not be reached by a pump operating in a single area. The transfer of most of the condensed liquid from the cold condensor chamber back to the warm evaporator chamber by pump or gravity means would therefore be impossible in the absence of gravity. The present invention solves this transfer problem by eliminating the need for the transfer of the liquid. This is accomplished by the provision of reversible means which enable each chamber to function alternatively as a warm evaporator chamber and as a cold condensor chamber. Thus, when most of the available liquid accumulates through condensation in the cold chamber, the functions of the chambers are reversed, i.e., the cold chamber (containing most of the liquid) functions as a warm evaporator chamber, and the warm chamber (which has lost most of its liquid) functions as a condensor chamber. The evaporator warm chamber would thus always contain sufficient quantities of working low boiling point liquid, and the engine would function continuously without the direct transfer of liquid from chamber to chamber.

The objective of the present invention is to provide a differential temperature solar engine which can function continuously without the direct transfer of liquid from chamber to chamber.

An additional objective of the present invention is to provide a reversible differential temperature solar engine which can function in the absence of gravity in space.

An additional objective of the present invention is to provide an engine which can function during the reversal of relative temperatures of the cold and warm chambers.

SUMMARY

The invention consists of a reversible differential temperature engine especially adapted to operate through solar energy in the absence of gravity in space. It consists of two chambers sealed from the outside environment and containing a low boiling point liquid. The arrangement is such that one chamber gains solar thermal energy while the other chamber loses solar thermal energy, to obtain a temperature differential between the chambers. This is accomplished through solar shields, in the form of umbrellas, operatively connected to each chamber. The respective solar shields are constructed to open upon one chamber and to close upon the other chamber. The closed solar shield upon one chamber allows solar radiation to reach and heat the chamber; the open solar shield upon the other chamber prevents solar radiation from reaching the chamber and thus causes a relative cooling of the chamber. The umbrellas of the two chambers are connected by the arms of a lever pivoting upon a single fulcrum, so that the opening of the umbrella on top of one chamber automatically closes the umbrella on top of the other chamber. The closing and opening of the solar shields are controlled by a battery-operated motor synchronized by a timer mechanism.

Each chamber contains a moveable wall portion whereby the internal volume of the chambers can be increased or decreased by the displacement of the moveable wall. The moveable wall operates through a bellows joint which allows the movement of the wall. The outside of the moving wall portions are connected by the arms of a lever pivoting upon a single fulcrum, so that the expansion of the bellows of one chamber results automatically in the contraction of the bellows in the other chamber.

A pair of conduits interconnect the chambers for the direction of flow of vapor between the chambers. A valve is disposed in each conduit for the closing and opening of the conduits. The arrangement is such that the valves normally keep the conduits closed until an associated moving wall portion has reached a predetermined limit of travel.

When the vapor pressure between the chambers is equal the pressures upon the moving wall portions of the chambers and their associated lever arms are likewise equal. As the vapor pressure of the warmer chamber is increased, the pressure upon the moveable portion of the chamber and its associated lever arm becomes larger than the pressure upon the moveable wall portion and associated lever arm of the cooler chamber. This causes the lever arm to turn away from the warm chamber and towards the cool chamber. When the moveable wall portion has been displaced a predetermined amount the valve in an associated conduit is opened and the vapor in the warm chamber flows into the cooler chamber, thus equalizing the pressures between the chambers. When this occurs the lever returns to its initial neutral position. This will cause the re-closing of the valve in the open conduit and the development of a new vapor pressure differential between the chambers.

The vapor which enters the cooler chamber condenses into liquid by the relatively cold temperature of the chamber. This causes the gradual accumulation of the liquid in the cooler chamber. When most of the liquid has, thus, been transferred from the warm to the cold chamber, the timer and motor mechanism close the solar shield of the cold chamber and open the solar shield of the warm chamber. The chamber containing most of the working liquid thus becomes the evaporator chamber, while the chamber which has lost most of its working liquid becomes the condensor chamber. The travel of the moving wall portion of the previously cold chamber is synchronized with the opening and closing of a valve in the second conduit, which allows an intermittent communication between the vapor phases of the chamber.

The movement of the moveable wall portions and associated lever is translated to useful work through conventional linkage mechanisms.

DETAILED DESCRIPTION

Referring to the drawings, there is shown in FIG. 1 a temperature fluid motor 10 embodying the present invention. As shown, a suitable frame 11 is provided for supporting thereon a pair of chambers 12 and 13.

As will be hereinafter described, each chamber functions alternately as an evaporator and as a condensor. Each of the respective chambers 12 and 13 is defined by circumscribing side walls 12a and 13a, having a connected top wall 12b and 13b, and bottom wall 12c and 13c, to define respectively a closed volume 12d and 13d.

The bottom walls 12c and 13c of the respective chambers 12 and 13 are connected to the circumscribing side walls 12a and 13a by means of expandable bellows joints 14 and 15 so that the bottom walls of the respective chambers can be moved in a reciprocating manner.

Distributed within the respective chambers 12 and 13 is a supply of an activating fluid 16. Preferably the activating fluid is a liquid having a low boiling point. A pair of connecting conduits 17 and 18 interconnect the respective volumes 12d and 13d of the respective chambers into communication with one another.

As will be hereinafter described, the connecting conduits 17 and 18 will alternately control the flow of vapor between the respective chambers 12 and 13. Control valves 17a and 18a are disposed in the respective conduits 17 and 18. Each valve 17a and 18a is a normally closed valve.

In operation, the control valves 17a and 18a are alternately actuated between open and closed positions automatically in response to the movement of the corresponding bottom walls 12c and 13c of the rspective chambers 12 and 13. This is attained by valve actuators or linkage connections 17b and 18b interconnected between the respective bottom walls 12c and 13c of the chambers 12 and 13 and the associated valves 17a and 18a. The respective valves 17a and 18a are provided with a suitable means, e.g., a valve spring to normally maintain the respective valves in a normally closed position. The arrangement is such that when the corresponding bottom wall has been displaced toward its maximum expanded position, the resistance of the valve spring is overcome to effect the opening of the associated valve through the operation of the connecting valve actuator.

Operatively disposed relative to the top walls 12b and 13b of the respective chambers 12 and 13 are solar shields 19 and 20. In the illustrated form of the invention, the solar shields 19 and 20 are in the form of umbrellas. In their open position the umbrellas are adapted to shield or shade the associated chambers from the rays of the sun, whereby the chambers are cooled. In the closed position of the umbrellas the associated chambers are exposed to the sun's rays and thus heated. By alternating the opening and closing of the respective solar shields 19 and 20, one chamber is being heated by the solar rays as the other chamber is being cooled or shielded from the solar rays.

Each of the solar shields 19 and 20 is similarly constructed. The respective shields comprise a foldable membrane 21 stretched over a framework of foldable spider arms 22. The spider arms 22 in turn are connected to a base ring 23 which is adapted to be slideably disposed on a column or standard 24.

A lever support 25 is disposed between the chambers 12 and 13 and is fastened to frame 11. Mounted on the lever support 25 is a standard 26 which functions as a fulcrum for a pivoting lever 27 comprising arms 27a and 27b. The arrangement is such that the opposed arms 27a and 27b see-saw about the fulcrum or standard 26. Arm extensions 28 and 29 extend upwardly from the ends of the respective arms 27a and 27b of the lever 27. As shown, the respective arm extensions 28, 29, are disposed contiguous to the slideable umbrella rings 23. Accordingly, as shown, the umbrella base rings 23 are fixed upon the respective arm extensions 28 29.

Operatively connected to the lever 27 is a motor drive means for effecting the actuation of the lever 27. The motor drive means includes a motor 30 which is operatively connected to the lever 27. The power of actuating the motor is derived from battery 31. The battery 31 utilized for powering the motor 30 may be suitably connected to a generator 32 whereby the battery can be readily recharged. The motor of the generator in turn is connected through a generator activator 33 to an extension or transmission arm 34 which is connected to the bottom wall of chamber 12. The arrangement is such that when motor 30 is activated, it will tilt lever 27 in one direction so that it opens one solar shield and closes the other. It will be understood that the motor may be reversible to alternate the opening and closing of the respective solar shields. Associated with motor 30 is timer 30a set to activate motor 30 at predetermined intervals.

A lever 37 is disposed beneath the moveable wall portions 12c and 13c of respective chamber 12 and 13. The lever 37 is supported by a fulcrum 38. The opposed arm portions of the lever 37 thus rotate or see-saw about their fulcrum 38. Arm extensions 39 and 40 extend from the end portions of the lever 37 so that arm extensions 39 and 40 are disposed contiguous to the respective moveable bottom walls 12c and 13c of the respective chambers 12 and 13. As shown the bottom walls 12c and 13c are in contact with the arm extensions 39 and 40 of lever 37. The arrangement is such that when arms 39 and 40 are in a neutral or horizontal position, the bottom wall 12c rests atop the extension arm 39 and the bottom wall 13c of the other chamber 13 rests or sits upon extension arm 40. Bellows 14 and 15 are in an intermediate position so that they can be expanded further upon the downward movement of the associated bottom wall or compressed upon the upward movement of an associated bottom wall.

Connected to the bottom wall 13c of chamber 13 is a force transmitting member 43. The extended end of the transmitting member 43 is connected through suitable mechanical means or linkages (not shown) whereby movement of the bottom wall 13c can be translated into useful work. The chambers 12 and 13 while interconnected between themselves are sealed off from the outside so as to prevent any loss ov activating fluid.

The operation of the differential fluid motor 10 described is as follows: One umbrella or solar shield 20 in its open position, while the other solar shield 19 is in a closed position. Thus the solar rays hitting on the exposed chamber e.g., 12 is greater than the solar rays acting on the chamber 13 which is shielded by the opened solar shield. This results in a temperature differential between chambers 12 and 13. The temperature differential causes the low boiling point liquid in the warmer chamber, e.g. 12 to be vaporized. As valves 17a and 18a are disposed in the connecting conduits 17 and 18 are in their normally closed position, the warmer chamber 12 is separated from the cooler chamber 13. Thus, the difference in temperature occuring between the respective chambers 12 and 13 will result in a vapor pressure differential between the chambers. As the activating fluid evaporates within the warmer chamber 12, the vapor pressure therein is gradually increased. As the vapor pressure increases in the warmer chamber 12, the force of the increasing vapor pressure is exerted on the moveable bottom wall member 12c. Thus, the vapor pressure acting on the bottom wall 12c will be greater than the vapor pressure forces being exerted on the bottom wall 13c of the cooler chamber 13. The bottom wall 12c of the warmer chamber 12 will therefore exert a force upon the arm extension 39 of lever 37. As the bottom wall 12c moves downwardly, it will simultaneously effect displacement of the lever arm 37 downwardly. This will result in an upward movement of the opposite lever arm extension 40. This, in turn, causes the bottom wall 13c of the cooler chamber to be displaced upwardly and compress the bellows joint 15 of the cooler chamber 13. The upward movement of the bottom wall 13c of the cooler chamber 13 will reduce the volume of the cooler chamber and consequently, compress the vapor within the chamber. The bottom wall 13c of the cooler chamber will move upwardly until the pressure of the compressed vapor within the cooler chamber counter-balances the vapor pressure occuring in the warmer chamber.

As the bottom wall 12c of the warmer chamber 12 moves downward and approaches its lower limit of travel or expanded limit, the valve actuator 17b opens the valve 17a in conduit 17 whereby the cooler chamber 13 is placed in communication with the warmer chamber 12. When this occurs, equalization of the vapor pressure between the two chambers is achieved, and lever 37 is returned to the neutral or horizontal starting position.

Upon the upward movement of the bottom wall 12c of chamber 12, the valve actuator 17b will cause the closing of the valve 17a to seal the cold chamber 13 from the warm chamber 12. The vapor which entered into the cooler chamber 13 from the warmer chamber 12 will subsequently condense due to the relatively cooler temperature of chamber 13. This will result in a reduction of the vapor pressure in the cooler chamber.

The motor 30 activating the solar shields is activated by timer 30a when most of the activating fluid has condensed in cold chamber. As the motor 30 is activated it raises arm 27a and lowers arm 27b. This closes left shield 20 as viewed in FIG. 1 and opens the right shield 19. The solar rays now reach container 13 to a larger degree than container 12. This reverses the temperature differential cycles so that chamber 12 becomes the relatively cooler chamber and chamber 13 becomes the relatively warmer chamber in which evaporation occurs. As valves 16a and 17a are closed, vapor pressure increases in the now warmer chamber 13 and exerts a pressure on the bottom wall 13c of chamber 13. This vapor pressure is larger than the vapor pressure in container 12 which is now shielded from the direct effects of the sun's rays by the open shield. Bottom wall 13c as it expands exerts a pressure on arm extension 40. The pressure on arm extension 40 being greater than the pressure on arm extension 39 causes lever 37 to pivot in a counter-clockwise direction. As the moveable wall 13c reaches its lower limit of travel, it causes valve actuator 18b to open valve 18a. This causes vapor to flow from container 13 to container 12 to equalize vapor pressure in both containers. This will cause the bottom wall 13c to move downward and bottom wall 12c to move upward. As bottom wall 13c moves downwards and reaches a predetermined limit of travel valve actuator 18b closes valve 18a and the vapor in container 12 condenses to form a liquid.

At a preset time, the motor 30 is activated by timer 30a to alternately open and close the solar shields 19 and 20 whereby the cycle of operation is repeated.

While the transmission member 43 is illustrated as being connected to the moveable wall portion 13c, it will be understood that the transmission member 43 may be associated with the bottom wall 12c of chamber 12 or to moving lever arm 37.

It is understood that conversion of cold chamber to warm chamber and warm chamber to cold chamber may be accomplished not only by alternating of a solar shielding but also by alternating other means, e.g. by changing the position of the chambers.

It will also be noted that in this form of the invention the movement of a moveable wall, e.g., 12c may be also utilized to operate the generator 32 to charge battery 31.

While the engine illustrated in this invention can function in the absence of gravity in space it is understood that the engine can likewise function in the presence of gravity. While the invention has been described with respect to one embodiment, it will be understood and appreciated that variations and modifications may be made without departing from the spirit or scope of the invention.

What is claimed is:

1. A reversible differential temperature engine comprising at least two chambers,
   inside of said chambers being sealed from the outside environment,
   a supply of evaporating liquid disposed within said chambers to exert a vapor pressure within said chambers,
   each of said chambers having a moveable member responsive to the vapor pressure changes within the chambers,
   vapor connecting means for the intermittent placing of the respective vapor portions of the chambers into communication,
   valve means for opening and closing said vapor communication,
   means to alternately synchronize the operation of said valve means with the movement of each moving member of each chamber,
   and means to alternately heat and cool each chamber to obtain a reversible temperature differential between the chambers.

2. A space reversible differential engine comprising at least two chambers, inside of said chambers being sealed from the outside environment, a supply of evaporating liquid disposed within said chambers, each of said chambers having a moveable member responsive to the vapor pressures within the chambers, vapor connecting means for the intermittant placing of the respective vapor portions of the chambers into communication, valve means for opening and closing said vapor communications, said valve means alternately synchronized with the movement of each moving member of each chamber, and alternate solar shields to intermittently shield each chamber from solar radiation to obtain a reversible temperature differential between the chambers.

* * * * *